United States Patent [19]

Wally et al.

[11] Patent Number: 4,641,958

[45] Date of Patent: Feb. 10, 1987

[54] SYSTEM AND METHOD FOR PROJECTING MULTIPLE IMAGES DIRECTLY ONTO PRINTING PLATES

[76] Inventors: Joseph H. Wally, 12302 W. 82nd Ter., Lenexa, Kans. 66215; Samuel E. Wilson, 15412 W. 90th St., Lenexa, Kans. 66219

[21] Appl. No.: 531,203

[22] Filed: Sep. 10, 1983

[51] Int. Cl.$^4$ .............................................. G03B 27/72
[52] U.S. Cl. ..................................................... 355/71
[58] Field of Search ............................... 355/18, 71, 67

[56] References Cited

U.S. PATENT DOCUMENTS

| | | | |
|---|---|---|---|
| 3,157,087 | 11/1964 | Kallenberg | 355/67 |
| 3,639,054 | 2/1972 | Wally, Jr. | 355/67 X |
| 3,998,546 | 12/1976 | Wally, Jr. et al. | 355/18 X |
| 4,215,935 | 8/1980 | Loebach | 355/67 |

Primary Examiner—Richard A. Wintercorn
Attorney, Agent, or Firm—Kokjer, Kircher, Bradley, Wharton, Bowman & Johnson

[57] ABSTRACT

A method and system for direct-to-printing plate multiple imaging. Supported on an overhead beam are a lamp house, a subject holder and adjacent condenser lens system, and an objective lens. The lamp house emits a highly intense, uniformly diverging beam of light which is narrow-banded to avoid excessive heat. The condenser lens system gathers the light and directs it through a film negative or positive on the subject holder. The objective lens focuses the film image on a metal printing plate which is held on a platen and coated with a photosensitive emulsion having an exposure time in the range of seconds rather than minutes.

20 Claims, 2 Drawing Figures

SYSTEM AND METHOD FOR PROJECTING MULTIPLE IMAGES DIRECTLY ONTO PRINTING PLATES

BACKGROUND AND SUMMARY OF THE INVENTION

This invention relates generally to multiple imaging systems and more particularly to a method and system for projecting film images directly onto photosensitive printing plates.

U.S. Pat. No. 3,998,546 which issued on Dec. 21, 1976 to Joseph H. Wally, Jr., et al. discloses a multiple imaging apparatus which has performed well using film as a medium. As described in the patent, the printing industry typically prepares printing plates by means of contact printing techniques utilizing film sheet assemblages known in the industry as film flats. The images that are to be printed are arranged side by side in rows and columns or other configurations on the film flat, and the images may all be the same or they may all be different from one another. In any event, the film flats are prepared by combining the desired images into the large sheets.

Although this type of apparatus has been used extensively and has been generally successful, the time and cost involved in preparing the printing plates are increased due to the two step process that is involved, namely, first projecting the images onto the film flats and then using the film flats to transfer the images by contact onto the printing plates. We have found that by using the present invention and its novel method and combination of components, the intermediate step of preparing film flats can be eliminated, along with the associated delay and cost. To our knowledge, there has not been a practical system available for imposing and assembling images directly onto a printing plate in a manner to successfully produce finished pages which include four color 150 line screen (or finer) halftone color separations with a level of quality as high as present contact methods.

The present invention provides such a system for the first time and has economic advantages in many applications over existing multiple imaging systems such as that shown in the aforementioned Wally, et al. patent. In accordance with the invention, a heavy duty support structure includes an overhead track from which the various components of the imaging system are suspended. High intensity, narrow-banded light is emitted by a high powered mercury arc lamp whose efficiency is heightened by a parabolic reflector. The high intensity light falls onto a dichroic mirror which reflects the light within a relatively narrow wave length band, such as 400–440 nanometers. The narrow banded light beam is collimated by a lenticular (fly's eye) optical integrator. The components of the high intensity light source are contained in a lamp house which is suspended from the overhead track and which can be adjusted along the length of the track by means of a motor operated screw-drive system.

The copy (usualy a film negative or positive) that is to be projected is loaded into an open faced and transparent subject holder which is likewise suspended from the track and adjustable along its length. The subject holder is affixed to a large condenser lens system which is positioned adjacent to the copy between it and the light source. The large condenser lenses intercept the diverging beam of collimated light and converge it through the copy on the subject holder toward an objective lens. After passing through the copy, the light is focused onto the objective lens and the image is projected by it onto the printing plate which is held by a vacuum platen at one end of the support structure. The printing plate is coated with a photosensitive emulsion having an exposure time that is short enough to make the process commercially practical (i.e., capable of being correctly exposed in a very few seconds, not in minutes).

We have found that the high resolution necessary to produce high quality printing can be obtained by using a high intensity, narrow-banded light source in combination with a large condenser lens system located adjacent to the subject holder.

DETAILED DESCRIPTION OF THE INVENTION

Figure 1:
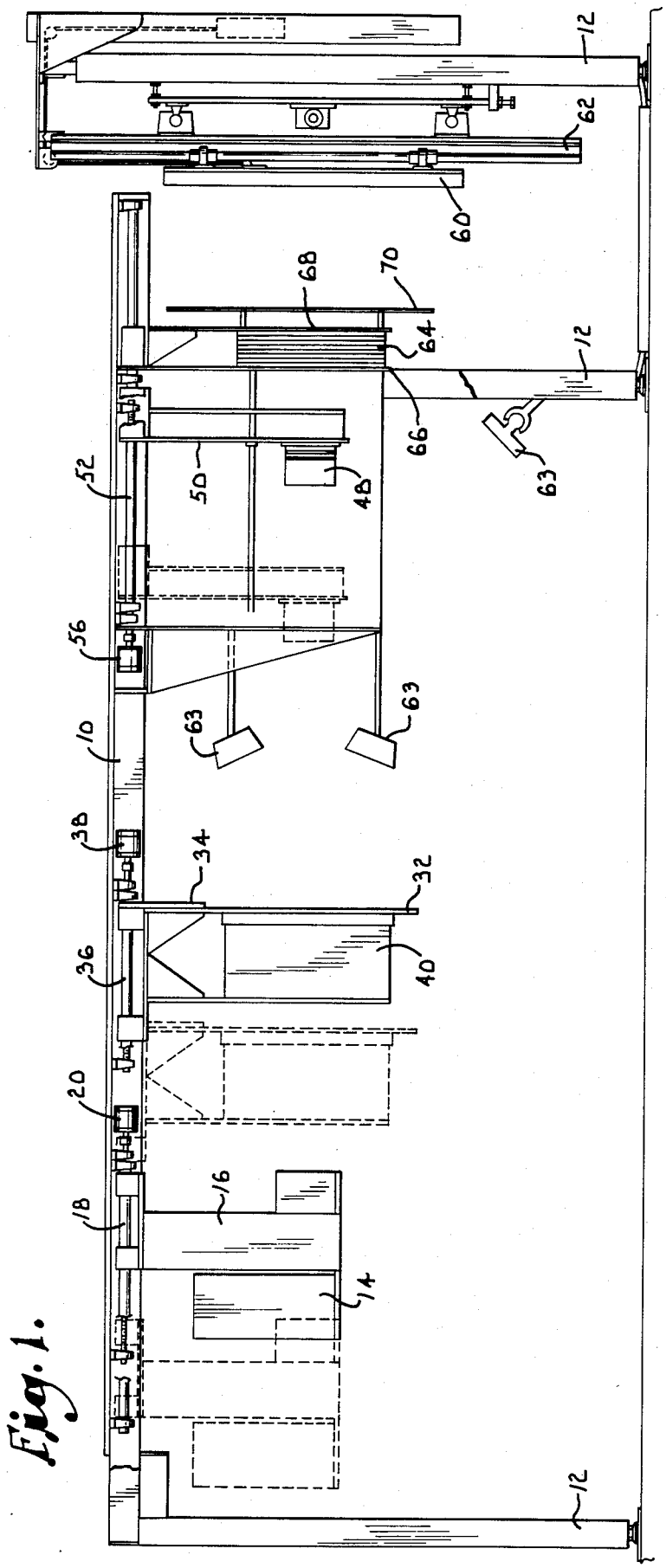
Figure 2:
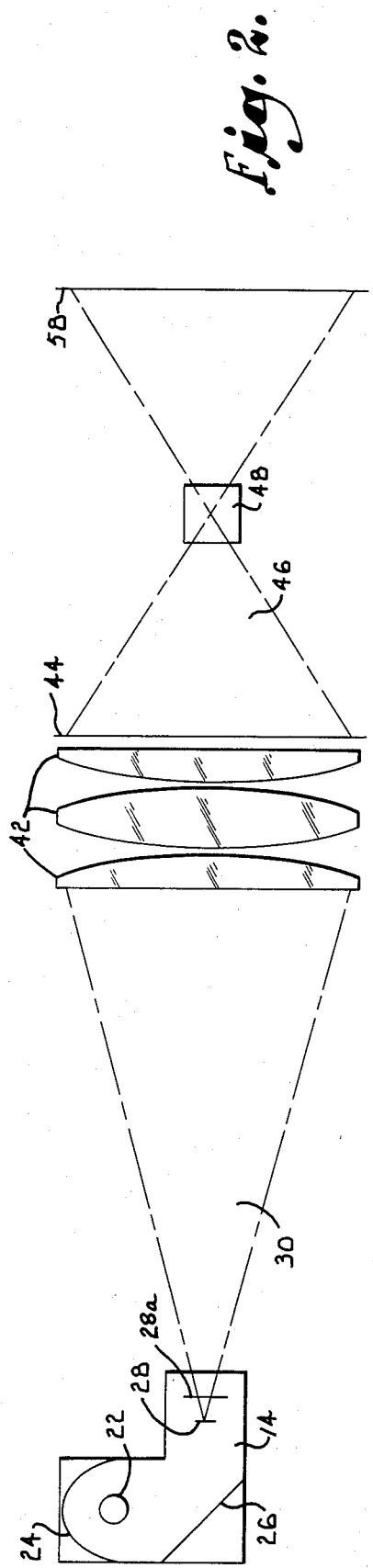

In the accompanying drawings which form a part of the specification and are to be read in conjunction therewith and in which like reference numerals are used to indicate like parts in the various views:

FIG. 1 is a side elevational view of a multiple imaging system constructed according to a preferred embodiment of the present invention; and FIG. 2 is a diagramatic view illustrating the method and system of the present invention.

Referring now to the drawings in more detail, the components of our imaging system are mounted on an overhead beam 10 which provides an elevated track along which the components can be moved. The overhead beam 10 is supported on a plurality of upright legs 12 located near its opposite ends. The support structure, including the overhead beam 10 and legs 12, is of the same type shown in U.S. Pat. No. 3,998,546 which is incorporated herein by reference. Reference can be made to the aforementioned patent to gain a detailed understanding of the support structure, which will not be described in detail herein.

A lamp house 14 is suspended from the overhead beam 10 near one end thereof. The lamp house 14 is carried on mounting plates 16 which are in turn mounted on horizontal guide rods 18 on the beam 10. The lamp house 14 can be moved back and forth longitudinally of the beam 10 by a screw drive system controlled by an electric motor 20. The drive system is of the same general type as disclosed in the aforementioned U.S. Pat. No. 3,998,546 to which reference can be made for a detailed understanding of the drive arrangement.

As shown diagramatically in FIG. 2, the lamp house 14 contains a high intensity light source in the form of a high wattage mercury arc lamp 22. A parabolic reflector 24 serves to direct the light emitted by the lamp toward a dichroic reflector 26 located within the bottom portion of the lamp housing. The reflector 26 reflects ultraviolet and visible wave lengths of light in a horizontal direction. Light in the infrared wave length is transmitted through the dichroic reflector 26 and removed as heat. A dichroic filter 28a (filtering a substantial portion of the remaining ultraviolet and all other visible light except blue light) is located past integrator 28, (discussed later) thereby transmitting only those wave lengths of light within the relatively narrow band of 400–440 nanometers. Wavelengths outside this range are substantially neither reflected by the dichromatic reflector 26 nor transmitted through the dichroic filter 28a thus eliminating the heat build-up which has always been typical of similar systems.

The wavelengths that are reflected encounter a lenticular (fly's eye) optical integrator, the exit end of which is designated by numeral 28. The fly's eye integrator 28 collimates the high intensity, narrow-banded light which is reflected from the dichroic reflector 26. Emitted from the exit end of the fly's eye integrator is a diverging light beam 30 which is uniform and closely controlled within the desired angle (a) such as 15°.

Referring to FIG. 1 in particular, a subject holder 32 is suspended from beam 10 in much the same manner as the subject holder shown in the aforementioned U.S. Pat. No. 3,998,546. A mounting plate 34 is secured to the subject holder 32 and is mounted for sliding movement along a pair of guide rods 36 supported on the overhead beam 10. An electric motor 38 operates through a screwdrive system to move the subject holder 32 back and forth along the length of beam 10. Reference can be made to U.S. Pat. No. 3,998,546 for the details of the mounting arrangment and screwdrive system for the subject holder.

Directly connected with the subject holder is a condenser lens system contained within a lens housing 40. As best shown in FIG. 2, the lens housing includes a condenser lens system 42 (including three lenses) which is located between the light source and the plane 44 of the copy which is held in the subject holder. The lens system 42 is in the path of the diverging light beam 30. After passing through the condenser lenses, the light beam is a converging beam as indicated at 46. Converging light beam 46 is directed through the copy (film negative or positive) held on the subject holder and is focused on a projection (objective) lens 48.

Referring again to FIG. 1, the projection lens 48 is carried on a mounting plate 50 having its top end received on a pair of guide rods 52 mounted on beam 10. An electric motor 56 operates to adjust the objective lens 48 back and forth lengthwise of the beam 10 in a manner similar to the systems provided for the lamp housing 14 and the subject holder 32.

The lens 48 projects the image onto a printing plate which is shown diagramatically at 58 in FIG. 2. As shown in FIG. 1, the printing plate 58 is held on a vacuum platen 60 which is in turn mounted on a support plate 62 in a manner providing that it can be adjusted both up and down and sideways as described in the aforementioned U.S. Pat. No. 3,998,546. The mounting plate 62 and platen 60 are located near the rear of the support structure adjacent to the legs 12.

Front lights 63 are provided and clustered to provide front lighting of the film copy for reflective imaging of positive film images.

The light beam which is directed toward the platen 62 from the projection lens 48 is contained within an expandable bellows 64. One end of the bellows 64 is secured to a vertical plate 66 supported at its top end on the overhead beam 10. The opposite end of the bellows is secured to another plate 68 which is located adjacent to an adjustable mask 70. As explained in the aforementioned U.S. Pat. No. 3,998,546, the mask 70 can be positioned adjacent to the platen 60 in order to prevent the light from "spilling over" onto the areas adjacent to the area of the printing plate which is intended to be exposed.

The method and system of the present invention is practiced by loading the film negative or positive that is to be printed into the subject holder 32. It is noted that the subject holder 32, lamp housing 14, and objective (projection) lens 48 can be adjusted as to their distance from one another and from the vacuum platen 60 which holds the printing plate on which the image is to be projected. By properly adjusting the various components, relative to one another, the copy image can be properly focused by the objective lens 48 and projected therefrom onto the printing plate 58 in virtually any desired size ratio.

The image is projected onto the photosensitive printing plate 58 by the light beam which is emitted intensely and in a narrow-banded manner from the lamp house 14. The diverging light beam 30 is collected by the condenser lens 42 and directed through the film copy in the subject holder and focused on the projection lens 48 which in turn projects the film image onto the portion of the printing plate on the optical axis and in the path of the beam. The printing plate 58 is coated with photosensitive emulsion which requires only a relative short exposure time (seconds as opposed to minutes) to provide a high quality image on the printing plate.

After each image has thus been projected onto the printing plate, the platen 60 is indexed in order to move another portion of the printing plate into the path of the beam. If the same copy is to be projected onto the adjacent area of the printing plate, another projection is made in the manner indicated previously. If a different piece of copy is to be used, the old copy is removed from the subject holder and the new copy is loaded into it before the next projection is carried out.

The equipment which comprises this invention works from either original, positive reflection type copy or film negatives or positives. If working from reflection copy, the copy is illuminated by front lights which cluster around the object lens housing and are directed at the original. That procedure can be positive-to-negative or positive-to-positive, and the imposed film so made can then be contacted to plate as is conventionally done. An alternative approach to positive reflection copy is to place a positive working transparent offset plate on the movable vacuum platen with the transparent base towards the lens. The images thus exposed are in a reverse, that is to say wrong reading attitude, such that the images on the printing plate become right reading when the plate is turned over and processed. If the input "copy" is in the form of film supplied by a customer, such as an advertising agency or ultimate purchaser, or a book publisher or printer, then such films are usually negative in nature. These are put on the transparent subject holder with the wrong-reading side toward the lens so that the image imposed or projected onto the front of an offset plate, usually metal, would be right reading and thus ready for press. All this is to say that the device being described can work equally well from transparent or opaque originals, negatives or positives, and go directly to film or plate with unprecedentedly high quality in terms of both position and resolution. In so doing it is distinguished from methods which employ microfilm whose placement in the camera cannot be sufficiently accurate to insure sufficiently high positional accuracy of the projected image nor the retention of halftone dot structure, particularly at both ends of the tonal scale in the highlight and shadow dots. The physical size of this device, intended to permit single image components of up to 12×18 inches or conventional double page spreads is thus capable of accepting and reproducing original input copy at "same size" so that whatever inaccuracies of placement of the input images do occur are kept as small as in the original, unlike microfilm systems which multiply original placement in accuracies by the enlargement factor, e.g., 2×−10×.

The use of a high intensity, narrow-banded beam of light from what is essentially a point source, in combination with the condenser lens and objective projection lens permits the image from the subject holder to be projected directly onto the printing plate 58 without the intermediate step of first preparing a film flat as has been necessary prior to our invention. The system and method of our invention permits direct to printing plate projection to be carried out in a manner to provide the quality and relatively large size image on the printing plate necessary in modern day, high quality printing, including quality halftones registered accurately enough for four color process printing.

The present invention achieves higher quality, both in the resolution of the image and in the image position on the printing plate, than the contract method which has been considered the benchwork of quality in printing plate preparation.

The present invention finds particular utility in connection with the printing of advertisements and other material that is printed periodically in the same form. It is common practice for advertising agencies to send full size duplicates of half tone separation sets of advertisements to the printers of the various periodicals in which the advertisements are to appear. After printing, the separation sets are often held by the printer since they may be used subsequently in a later month's issue. With the present invention, the sets can be imaged directly on the printing plates, and special and expensive procedures do not have to be followed as has been necessary in the past.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A method of transferring an image along an optical path to be printed directly onto a rigid printing plate having a photosensitive coating, said method comprising the steps of:
    generating from a substantially point source a uniformly diverging beam of highly intense light having wavelengths restricted to a relatively narrow wavelength band;
    limiting heat build-up in said optical path;
    providing an objective lens;
    passing said diverging beam of light through a condenser lens to obtain a converging beam which converges in the objective lens;
    locating copy containing the image adjacent the condenser lens and in the path of the beam to project the film image;
    focusing the converging beam on the objective lens; and
    projecting the beam from the objective lens onto a preselected portion of the printing plate for sufficient time to expose the photosensitive coating, thereby providing the image on said preselected portion of the printing plate.

2. A method as set forth in claim 1, wherein said wavelength band is approximately 400-440 nanometers.

3. Apparatus for transferring a film image along an optical path directly onto a rigid printing plate having a photosensitive coating, said apparatus comprising:
    a lamp;
    means associated with said lamp for providing a diverging beam of high intensity light emanating from a point source and restricted to within a narrow wavelength band;
    means for limiting heat build-up in said optical path;
    a condenser lens supported in the path of the diverging beam, said condenser lens being located and arranged to receive the diverging beam and to produce a converging beam which is focused at a preselected location;
    means for locating copy containing the film image adjacent said condenser lens and in the path of the converging beam to project the film image;
    an objective lens supported at said preselected location to receive the focused beam and to project same toward the printing plate; and
    means for supporting the printing plate at a location in the path of the projected beam to expose the photosensitive coating on a preselected portion of the printing plate for sufficient time to transfer the film image onto said preselected portion of the printing plate.

4. The invention of claim 3, wherein said beam providing means includes:
    a lamp house;
    said lamp being a high intensity light source located in the lamp house;
    a dichroic reflector in the lamp house for receiving the light emitted by said source and reflecting only those wavelengths within said narrow wavelength band; and
    means in the lamp house for collimating the narrow banded, high intensity light to provide said diverging beam.

5. The invention of claim 4, including a parabolic reflector in the lamp house for reflecting light from said source toward said dichroic reflector.

6. The invention of claim 5, wherein said narrow wavelength band is approximately 400-440 nanometers.

7. The invention of claim 3, wherein said narrow wavelength band is approximately 400-440 nanometers.

8. The invention of claim 4, wherein said light source is a mercury arc lamp.

9. In lines 21 and 25, please delete the word "assembly" following the word "lens" in each instance.

10. The invention of claim 9, wherein said narrow wavelength band is approximately 400-440 nanometers.

11. The invention of claim 9, including a parabolic reflector in said lamp house for reflecting light toward said dichroic reflector.

12. The invention of claim 9, wherein said source of light is a mercury arc lamp.

13. The invention as in claim 9 including means for limiting heat build-up in said apparatus by removing preselected light wavelengths of light emitted by said source.

14. The invention as in claim 3 wherein said means for limiting heat build-up includes a means for removing infrared light wavelengths in said optical path.

15. The invention as in claim 3, including means for removing ultraviolet and other preselected visible wavelengths of light in said light path.

16. The invention as in claim 3 wherein said heat build-up includes a means for removing infrared light wavelengths in said optical path and means for removing ultraviolet and other preselected visible wavelengths of light in said light path.

17. The invention as in claim 3, including means for removing infrared light, ultraviolet light, and other visible wavelengths of light except blue light in the optical path.

18. The method as in claim 1 wherein said heat limiting steps include the step of removing infrared light wavelengths from said generated light.

19. The method as in claim 18 including the step of removing ultraviolet and other preselected visible wavelengths of light in said light path.

20. The method of claim 1 wherein said heat limiting step includes the step of removing infrared light, ultraviolet light, and other visible wavelengths of light except blue light in the optical path.

* * * * *